(12) United States Patent
Shelton et al.

(10) Patent No.: US 7,383,159 B1
(45) Date of Patent: Jun. 3, 2008

(54) REUSABLE MEASURES

(75) Inventors: Scott Shelton, Apex, NC (US); Henry Fu, Chapel Hill, NC (US); Steven Kennedy, Wendell, NC (US); Jason Figge, Cary, NC (US); Michael Chaves, Cary, NC (US); Harold Lee, Holly Springs, NC (US)

(73) Assignee: Teradata US, Inc., Miamisburg, OH (US)

( * ) Notice: Subject to any disclaimer, the term of this patent is extended or adjusted under 35 U.S.C. 154(b) by 0 days.

(21) Appl. No.: 11/301,977

(22) Filed: Dec. 13, 2005

(51) Int. Cl.
*G06F 15/82* (2006.01)
*G06F 7/00* (2006.01)

(52) U.S. Cl. .................. 702/189; 707/10; 707/102; 707/200

(58) Field of Classification Search ............. 702/119, 702/123, 189; 705/14, 7; 709/224; 707/2, 707/4, 101, 102, 10, 200
See application file for complete search history.

(56) References Cited

U.S. PATENT DOCUMENTS

| | | | |
|---|---|---|---|
| 5,832,496 A | * | 11/1998 | Anand et al. ............... 707/102 |
| 6,208,975 B1 | | 3/2001 | Bull et al. |
| 6,212,515 B1 | | 4/2001 | Rogers |
| 6,434,544 B1 | | 8/2002 | Bakalash et al. |
| 6,560,647 B1 | | 5/2003 | Hafez et al. |
| 6,567,804 B1 | | 5/2003 | Ramasamy et al. |
| 2002/0099585 A1 | * | 7/2002 | Locke ........................... 705/7 |
| 2003/0229652 A1 | * | 12/2003 | Bakalash et al. ........... 707/200 |
| 2005/0060317 A1 | * | 3/2005 | Lott et al. ..................... 707/10 |

* cited by examiner

*Primary Examiner*—John E. Barlow, Jr.
*Assistant Examiner*—John H Le
(74) *Attorney, Agent, or Firm*—Schwegman, Lundberg & Woessner, P.A.

(57) ABSTRACT

Techniques are presented for reusing business measures within a data store. A measure is associated with a measure type. Each measure is associated with a particular data store schema or schema element and includes metadata for fields and calculations against those fields. Requestors can select existing measures, create new measures, delete existing measures, and/or modify existing measures. A measure, when processed against the data store, produces results from a data store that are associated with the data store schema or the schema element and which conform to the fields and calculations defined within the measure's metadata.

20 Claims, 6 Drawing Sheets

FIG. 4

| | Percentile Profiling type measure which is used to group and order the data into deciles | Schema Count measure which counts the total number of individuals in each decile | Segment Count measure which counts the number of individuals in the Male segment of each decile | Segment Count measure which counts the number of individuals in the Female segment of each decile | Tables and Fields measure which calculates the total purchase amount of each decile | Percentile Profiling type measure which calculates the total purchase amount of each decile and then adds the values cumulatively | Attribute type measure which calcuates the average number of items bought based on a predefined attribute |
|---|---|---|---|---|---|---|---|
| Decile | Avg. Purchase Amt. | Customer Count | Males | Females | Total Purchase Amt. | Cumulative Purchase Amt. | Avg. Item Qty. |
| 1 | $3,250 | 53 | 26 | 27 | $172,250 | $172,250 | 4,277 |
| 2 | $2,161 | 79 | 41 | 38 | $170,719 | $342,969 | 2,766 |
| 3 | $1,688 | 101 | 50 | 51 | $170,488 | $513,457 | 1,645 |
| 4 | $1,357 | 127 | 69 | 58 | $172,339 | $685,796 | 1,230 |
| 5 | $1,056 | 163 | 75 | 88 | $172,128 | $857,924 | 1,220 |
| 6 | $854 | 202 | 110 | 92 | $172,508 | $1,030,432 | 851 |
| 7 | $693 | 249 | 122 | 127 | $172,557 | $1,202,989 | 841 |
| 8 | $526 | 318 | 154 | 164 | $167,268 | $1,370,257 | 597 |
| 9 | $386 | 445 | 216 | 229 | $171,770 | $1,542,027 | 430 |
| 10 | $141 | 1,212 | 590 | 622 | $170,892 | $1,712,919 | 280 |

Measure Editor:
Create new measure

Measure Name:
Double Avg Purchase Amount

Measure Type:
Tables and Fields ▶

Description:
Measures 2 * the average purchase amount of a household in the analysis segment This measure can be used in Cross Segment Analysis, Percentile Profiling, and Product Affinity Analysis.

Analysis Information:

Calculation:

Analysis Semantic: Customers ▶

1st Aggregation: Custom Formula ▶ Define...

Analysis Level: Household ▶

SUM(Trans.Purchase_Amt)*2

Display Format Mask: $#,##0 ▶

2nd Aggregation: Average ▶

Filter Customers: Define...

EXAMPLE:

| Household | Trans.Purchase_Amt | 1st Aggregation (Custom Formula) | 2nd Aggregation (Average) |
|---|---|---|---|
| 1 | $5 | | |
| 1 | $10 | | |
| 1 | $5 | $40 | |
| 2 | $8 | | |
| 2 | $4 | $24 | $28 |
| 3 | $5 | | |
| 3 | $5 | $20 | |

Status: Active ▶   Version: 1 (current)

Save   Save As   Validate   Close

FIG. 5

Measure Editor:
Create custom formula

Create a custom SQL formula using the functions, tables, fields, and operators below. You may use fields from different tables.

Function:
Average
Count
Count Distinct
Max
Min
Sum
Variance

Tables:
ACCOUNT_ACTIVITY_SUMMARY
ACCOUNT_MASTER
HOUSEHOLD_ACTIVITY_SUMMARY
INDIVIDUAL_ACTIVITY_SUMMARY
PERIOD_ACCT_X_STORE_SUMMARY
QUARTER_ACCT_X_STORE_SUMMARY
TRANS
WEEK_ACCT_X_STORE_SUMMARY
YEAR_ACCT_X_STORE_SUMMARY

Fields:
Category Code
Class ID
Department ID
Division ID
Group Code
Item ID
Items Qty
Purchase Amt
Purchase Date
Region ID
Sales Associate ID
Segment ID
Store Activity
Transaction Number
Transaction Type
Vendor ID

Operators:
+ - * / ( )

[Clear] [Add to Formula]

Custom Formula:
SUM(Trans.Purchase_Amt)*2

[Apply] [Validate] [Close]

FIG. 6

REUSABLE MEASURES

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2005, NCR Corp. All Rights Reserved.

FIELD

The invention relates generally to data processing and more particularly to techniques for creating, managing, and using reusable measures for data processing.

BACKGROUND

Enterprises are regularly evaluating their business and customer data for purposes of analyzing that data and discerning patterns or opportunities. In fact, a variety of databases, database query languages, data mining, and data reporting tools and services exist within the industry for purposes of automating an enterprise's data collection, data mining, data analysis, and data reporting.

One aspect of data analysis is related to business measurements. A business measurement is where a piece of information is aggregated in some manner. For example, an attribute might be discrete groupings within age data that conforms to a range of predefined ages for customers, such as customer group 1: ages 17 and under, customer group 2: ages 18-24, customer group 3: ages 25-34, and so on. A measure may then be used to count the number of people in the 18-24 age grouping or even average the cost of insurance for people over age 60, etc.

Generally, these measures are manually established by a business analyst by creating custom queries and performing operations on the queries to generate intermediate tables of information. The intermediate information then forms a measurement that can be evaluated by the business analyst.

One obvious drawback to this approach is that it is not reproducible and it leads to a lot of rework. That is, unless one business analyst is familiar with the work of another, a particular measure is not reusable and is recreated. Moreover, even if an existing measure is communicated, it is often not directly on point and requires manual modification to be useful.

Additionally, measures are often not categorized in any automated sense such that measures, which are related to one another, are easily located. Thus, even if there is a manual attempt to share measures; that manual process is likely fraught with comprehension problems because measures are not typically classified in related areas such that locating a desired measure is something practically and efficiently achievable.

Thus, it can be seen that improved business measurement construction, management, and processing are desirable.

SUMMARY

In various embodiments, techniques for reusing measures are provided. In an embodiment, a list of available measure types is presented to a requestor for selection. The requestor makes a selection, which identifies a desired measure type. Next, a new list is presented; the new list includes available measures, which are defined for the desired measure type that the requestor selected. Finally, another selection for a desired measure is received from the requester, and metadata for the desired measure is presented to the requester.

BRIEF DESCRIPTION OF THE DRAWINGS

FIG. 4 is an example diagram of sample results associated with processing some example reusable measures, according to an example embodiment.

FIG. 5 is an example diagram of a screenshot for a measure editor and some example results associated with processing an example reusable measure constructed from the measure editor, according to an example embodiment.

FIG. 6 is an example diagram of another screenshot for a measure editor and some example metadata for defining custom calculations for a reusable measure, according to an example embodiment.

DETAILED DESCRIPTION

Figure 1:
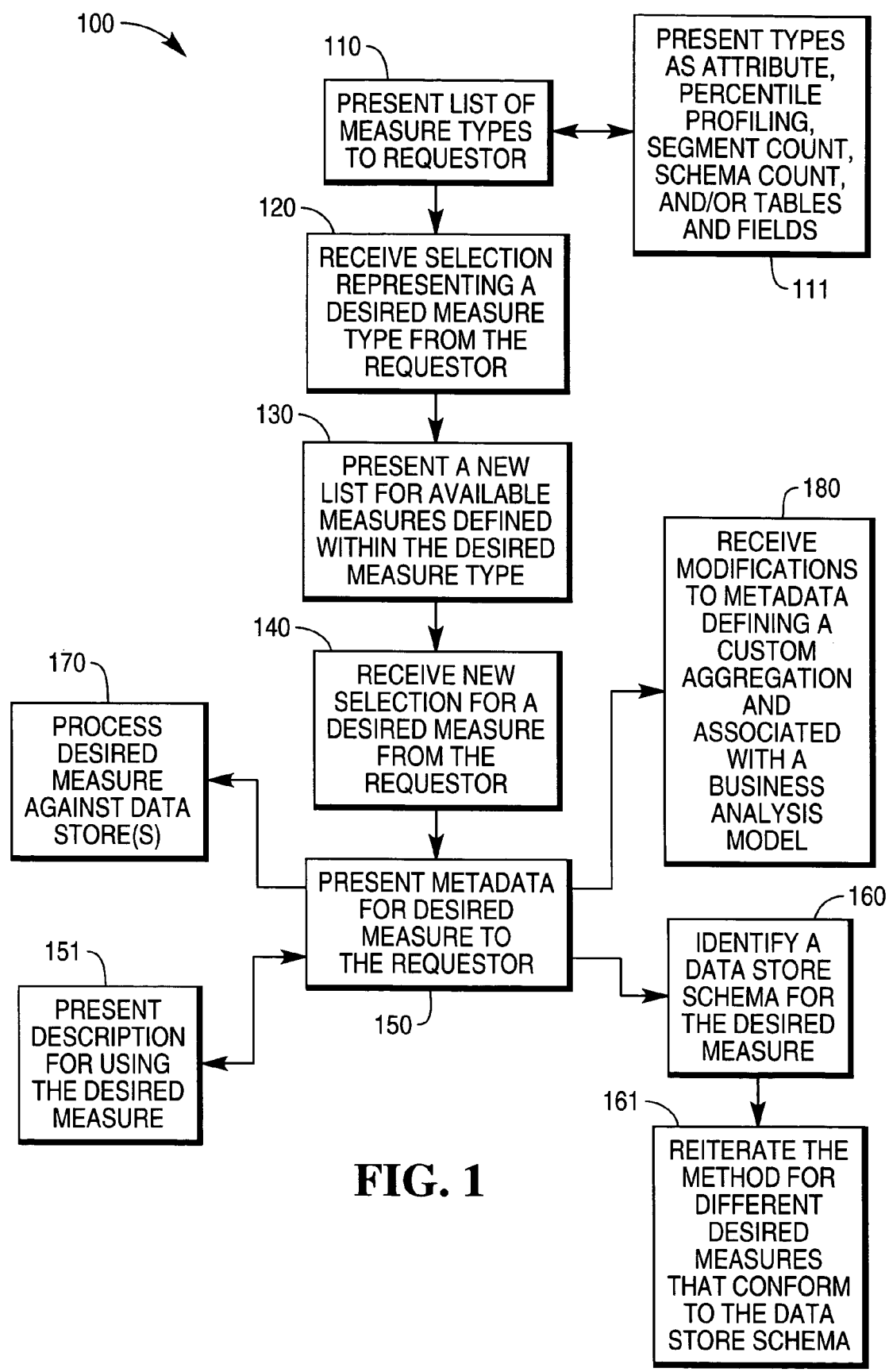
FIG. 1 is a diagram of a method for acquiring and using a measure in an automated fashion, according to an example embodiment.

FIG. 1 is a diagram of a method 100 for acquiring and using a measure in an automated fashion, according to an example embodiment. The method 100 (hereinafter "measurement service") is implemented in a machine-accessible or computer-readable medium and is accessible over a network. The network may be wired, wireless, or a combination of wired and wireless.

The measurement service may be implemented as an interface that interacts with a requestor or a user, such as a business analyst. The measurement service permits the reuse of business measures based on measure types. That is, each measure type includes a plurality of available measures. These measures may be generic or may be specific instances of reusable measures that were previously created by a requestor that interacted with the measurement service. The measurement service facilitates creating, identifying, perhaps modifying, and using these measures. In some cases, multiple measures are used within a business analysis module to produce reports for a requestor. In other cases, the measure may be used independent of any business analysis module by the requestor to produce a report.

The measures operate against a specific data store schema associated with one or more data store tables. A data store may be a relational database, a data warehouse, a directory, etc. The data store tables include business or enterprise data that a requester wants to analyze in some manner that the measures and/or business analysis modules can assist with.

A measure is one or more calculations against business or enterprise data that is aggregated in some manner. For example, summing (a calculation) the total volume of sales (business data) by week (aggregation) represents a simple form of a measure. Another, and perhaps more representative measure, may involve two aggregations, such as summing (first calculation) the total dollar value of sales (business data) by individuals (first aggregation) and then averaging (second calculation) the result by week (second aggregation). A variety of types of measures can exist.

Some measure types can include an attribute measure, a percentile profiling measure, a segment count measure, a schema count measure, tables and fields measure, and other custom-defined measures. An attribute measure is a calculation within a given field of a data store (as specified by the attribute), such as the number of store visits by a customer. A percentile profiling measure is a calculation that can be used to divide a result set into evenly distributed groups, such as create deciles for customer spending by sales into 10 groups represented by 10%, 20%, 30%, and so on. A segment count measure counts a value within a given field, such as count all customers (which have attributes described by one or more fields) that are female (value). Notice that both percentile profiling and segment count measures are two-step aggregations. A schema count counts values within a given schema or context, such as count the number of unique individuals within an intersection of two different data store segments. A tables and fields measure is a two step calculation or aggregation, such as calculate the average purchase amount by household over a time period. It is noted that other measure types may be custom defined and still fall within the various embodiments described herein.

Initially, a requestor interacts with interfaces of the measurement service for purposes of either acquiring a measure that is relevant to an analysis being performed by the requestor or to modify an existing measure so that the modified measure is relevant to the analysis. In an embodiment, the interaction with the measurement service may also be used in combination with a business analysis tool that interactively builds a business analysis module for the requestor, where the business analysis module produces one or more reports detailing the analysis desired by the requestor. Thus, the requester may directly interact with the measurement service or may indirectly interact with the measurement service via a business analysis tool, where the business analysis tool may also interact with the measurement service. In some cases, the requestor may also custom create an entirely new measure.

Accordingly, at 110, the measurement service presents a list of measure types to a requestor. This list may be directly supplied to the requestor or indirectly supplied through a business analysis tool. Again, in some embodiments, at 111, the types of measures presented may include, but are not limited to, an attribute measure, a percentile profiling measure, a segment count measure, a schema count measure, a tables and fields measure, a custom-defined measure, etc.

At 120, the measurement service receives a selection for a specific desired measure type from the requestor in response to the list of available measure types. Once a selection is made, the measurement service can generate a new list to present to the requestor for all the available reusable and generic measures that are associated with the particular desired measure type.

Accordingly, at 130, the measurement service presents a new list of available measures that are defined from the desired measure type and/or schema element that was previously selected by the requester, at 120. This results, at 140, in the requestor making yet another selection for a specific desired measure and this selection is received by the measurement service for further processing.

Next, at 150, the measurement service presents metadata associated with the desired measure to the requestor. The metadata describes the operation and describes the configured parameters for the desired measure. Some configured parameters may include the analysis schema and level for the data store, display information, calculation information, filter information, ordering information, and the like. The metadata describes the desired measure in a high-level manner to the requester. An example of this is presented and described below with the FIG. 5.

In an embodiment, at 151, the metadata may be used for presenting a description of the desired measure, such as what the desired measure is designed to calculate and how it goes about achieving that calculation. This descriptive information allows non-technical business analysts to view and comprehend the desired measure and its operations. This facilitates reuse of the desired measure and reduces the likelihood that measures will be recreated when they do not have to be.

Also, at 160, once the metadata is presented or obtained for a given desired measure, the data store schema or schema element against which the desired measure can be processed is identified. The data store schema or schema element defines the data store tables and their fields against which the given desired measure can process. The identified data store schema or schema element becomes a business rule for the desired measure such that any data store table that the desired measure is processed against will have to conform to the data store schema or schema element. In some cases, the data store schema or schema element may be part of the metadata or separate from the metadata and embodied as the business rule.

According to an embodiment, at 161, the entire method 100 represented by the processing 110-160 of FIG. 1 may be re-iterated or processed by the requestor for one or more additional iterations to use and assemble a variety of other different desired measures. Each additional and different desired measure is forced to conform to the data store schema or schema element, which was identified with the original desired measure, at 160. This may be useful when the requestor is interacting with a business analysis tool and is building a business analysis module, which may include a variety of different measure types and measures for purposes of performing a multilevel calculation or analysis.

In an embodiment, at 170, the measurement service may also be used to process the desired measure against a data store for the requestor. The requestor may view a subset of results in a window presented to the requestor to see if this is what the requester expected before the requestor commits to using the desired measure. An example view of these results associated with the process of a desired measure is depicted in FIG. 5 and discussed below.

One now appreciates how measure types may be defined and measures associated therewith. These measures may be acquired, viewed, and manipulated by requesters to facilitate the reuse of the measures.

Figure 2:
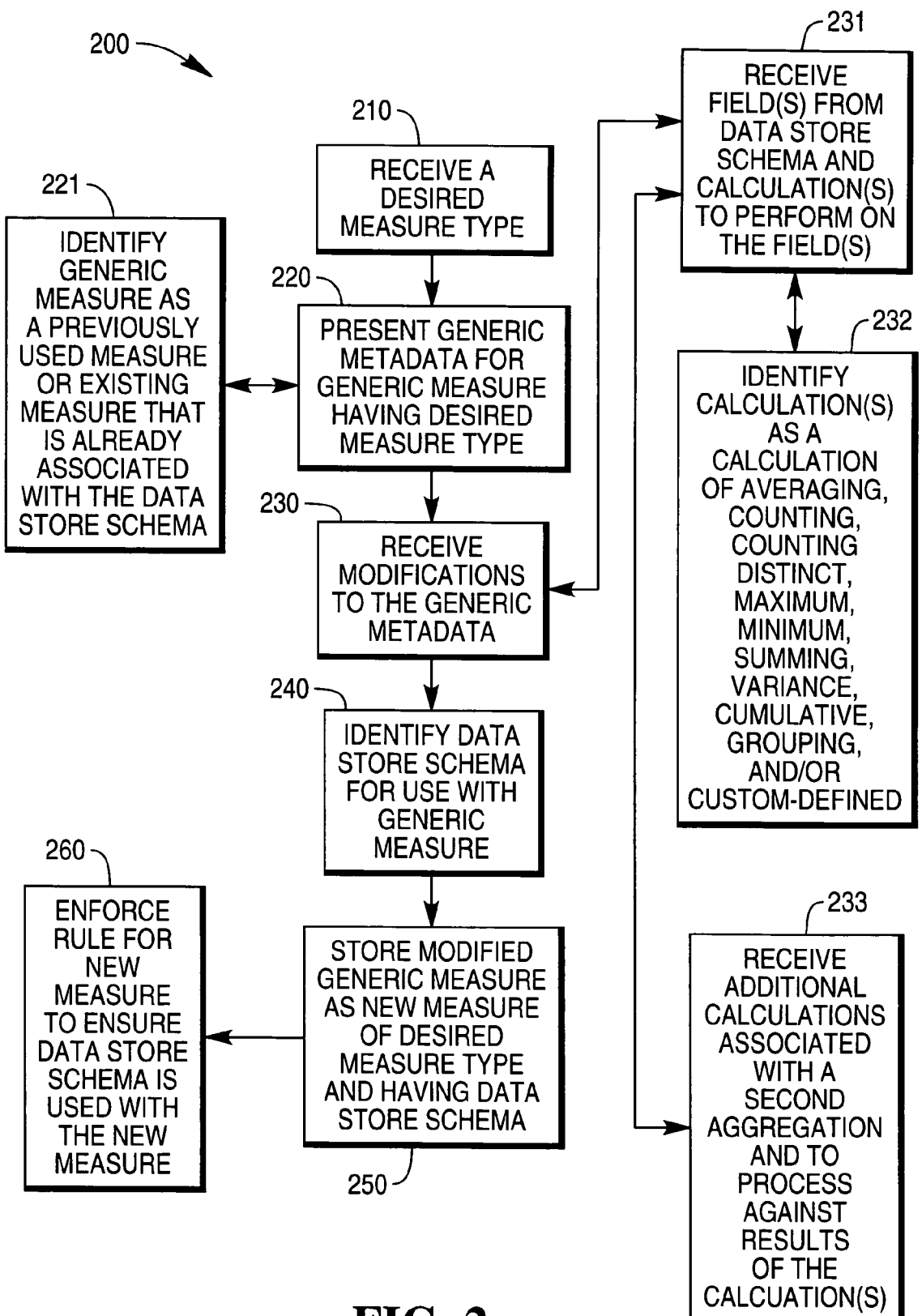
FIG. 2 is a diagram of a method for creating a reusable measure in an automated fashion, according to an example embodiment.

FIG. 2 is a diagram of a method 200 for creating a reusable measure in an automated fashion, according to an example embodiment. The method 200 (hereinafter "measurement creation service") is implemented in a machine-accessible and readable medium and is accessible over a network. The network may be wired, wireless, or a combination of wired and wireless. In an embodiment, the measurement creation service represents a subset of processing or a mode of processing for the measurement service represented by the method 100 of FIG. 1. The measurement creation service permits new reusable measures to be established by requesters.

At 210, the measurement creation service receives a desired measure type from a requester; receipt of the desired measure type can be directly or indirectly received from the requester. Examples of how the requestor decides or selects a measure type from a list of available measure types was presented above with the description of the method 100 of the FIG. 1.

At 220, the measurement creation service presents generic metadata for a generic measure associated with the selected desired measure type. In other words, the description and processing parameters associated with a given desired measure type may be used to generate a generic measure that may be modified by the requestor for purposes of establishing a desired or new measure.

According to an embodiment, at 221, the measurement creation service may identify the generic measure as an existing and valid measure, which was previously used and defined, and that is already associated with a particular data store schema. Thus, a generic measure may be an existing measure that the requestor is permitted to modify and save as a new measure that the requestor desires.

At 230, the measurement creation service receives modifications to the generic metadata for the generic measure. Again, these modifications are received from the requestor. At this point if a data store schema or schema element is not already defined within the generic measure it may be defined by the requestor. In some cases, the data store schema or schema element may already be defined within the generic measure or assigned by the requestor at a different point in the processing.

According to an embodiment, at 231, if the data store schema or schema element is known, then the measurement creation service may receive from the requestor fields from that schema and one or more calculations to perform on those fields. The calculations represent some form of computation and aggregation on values associated with the fields. When processed the actual data in one or more data store tables that conform to the data store schema or schema element are processed by the measure to evaluate fields therein and perform the calculations. This provides an analysis of the data included within the data store tables.

In an embodiment, at 232, the one or more calculations may be selected from predefined calculations or may be custom-defined. Some examples of predefined calculations may include, by way of example only, an averaging calculation, a counting calculation, a counting distinct calculation, a maximum calculation, a minimum calculation, a cumulative calculation, a grouping calculation, etc.

In some cases, at 233, the measurement creation service may receive additional calculations that are associated with a second aggregation. The second calculations may aggregate information associated with results from processing a measure or part of a measure in the case where the measure is a tables and fields measure. That is, multiple layers of aggregation can be achieved against a single defined measure. Each additional aggregation uses additional calculations that process on results associated with processing the prior calculations. Percentile Profiling and Segment Count Measures are examples of two step aggregations.

At 240, the measurement creation service identifies the data store schema or schema element that is being used with the generic measure, which has now been modified. Again, the identity of this data store schema or schema element may be initially acquired in a variety of manners. For example, the schema may be already associated with the generic measure that was supplied to the requestor; the schema may be manually supplied by the requestor; or the schema may be derived from the modifications received from the requestor. It is appreciated that the processing of 240 may actually precede the calculations.

Once the modification to the metadata data and the data store schema are known and/or received from the requester, at 250, the measurement creation service stores the modified generic measure as a new measure having the desired measure type. At this point the new measure is retrievable from a list maintained by the measurement creation service or the measurement service represented by the method 100 of the FIG. 1 and selectable by a user directly based on a description associated with the new measure or based on a selection of the desired measure type to which the new measure is associated with. This permits the new measure to be reused and readily acquired.

In an embodiment, at 260, the measurement creation service may also enforce or establish a variety of business rules for the new measure. For example, the measurement creation service may enforce a rule that states that the new measure may only use the schema element specified in the business analysis module.

The method 100 presents a technique for acquiring and using an existing measure. The method 200 presents a technique for creating or modifying an existing measure for purposes of creating a new measure that can then be used by the method 100. Again, it is noted that the methods 100 and 200 may be combined into a single service or tool, such that from the perspective of the requestor the two methods 100 and 200 appear to be one and the same. The methods combine to present techniques for creating, managing, and reusing measures in independent applications or within business analysis modules created by business analysis tools.

Figure 3:
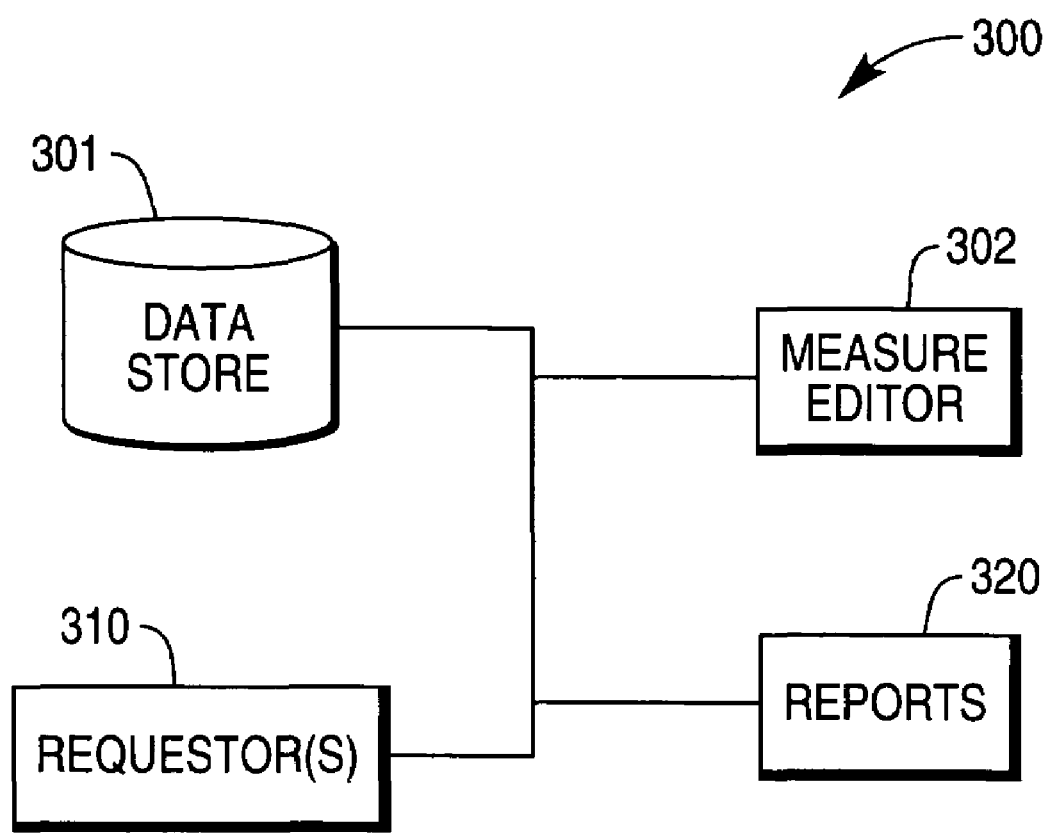
FIG. 3 is a diagram of a reusable measurement system, according to an example embodiment.

FIG. 3 is a diagram of a reusable measurement system 300, according to an example embodiment. The reusable measurement system 300 is implemented in a machine-accessible and readable medium and is operational over a network. The network may be wired, wireless, or a combination of wired and wireless. In an embodiment, portions of the reusable measurement system 300 implement, among other things, the methods 100 and 200 of the FIGS. 1 and 2, respectively.

The reusable measurement system 300 includes a data store 301 and a measure editor 302. These components interact with requesters 310 to produce measures. The measures may be independently processed or processed as part of business analysis modules, and when the measures are processed against the data store 301 one or more reports 320 are produced. The data store 301 and the measure editor 302 will now each be discussed in turn.

The data store 301 may include a database, a plurality of databases organized as a data warehouse, a directory, electronic files, and/or various combinations of the same. The data store 301 houses business or enterprise data in one or more data store tables. Each table conforms to a data store schema or definition. Some tables may have the same or similar schema, whereas other ones of the tables may have their own unique schema.

The data store 301 also includes tables that house information related to measure types and measures. This information includes, among other things, metadata for the measure types and measures that permit the measure editor 302 to present, assemble, and manage the measure types and measures. Essentially, the data store 301 is a backbone to the information processed and managed by requesters and by the measure editor 302.

The measure editor 302 interacts with the data store 301 and a requestor 310 to build a business analysis module. The business analysis module includes one or more measures that are selected by the requestor 310 via the measure editor

302. Measures are dependent upon measure types. That is, any particular measure is associated with a defined measure type. The measure types, the measures, and the business data reside in the data store 301.

The measure editor 302 permits the requestors 310 to create new measure types and/or create new measures for a given measure type within the data store 301. In an embodiment, this is may be achieved by the measure editor 302 permitting a requestor 310 to modify metadata, which is included within the data store 301, for selected measure and to record the modifications as new instances of new measures within the data store 301. Examples of this were provided above with respect to the method 200 of the FIG. 2.

In some embodiments, the measure editor 302 may also permit existing measures or measure types to be deleted from the data store 301. The measure editor 302 may also enforce a particular data store schema or schema element as a business rule for any selected measures included within the business analysis module or for any selected measure. That is, a same data store schema or schema element may have to be used for any particular measure or particular business analysis module. Again, a business analysis module may be one or more measures and perhaps other processing organized together to form a processing unit or script referred to as the business analysis module.

Thus, the business analysis module may include one or more aggregation calculations for the business data and for results associate with processing select ones of the measures against that business data. In some embodiments, the one or more aggregation calculations may be selected from a list supplied to the requestor by the measure editor 302 or may be custom-defined by the requestor through other interfaces associated with the measure editor 302.

Examples of how the measure editor 302 interacts with the requestor were presented above with the methods 100 and 200 of the FIGS. 1 and 2, respectively. The methods 100 and 200 also described how measures may be reused, created, and processed. The reusable measurement system 300 provides the added data store 301 where the information used to create and manage measures may be centrally stored and accessed. Additionally, the reusable measurement system 300 provides the development of a business analysis module that includes one or more measures assembled in a self-contained processing unit or script that can process against business data residing in the data store. In some embodiments, the measure editor 302 may also interact or enlist the services of a business analysis tool to build and/or assemble the business analysis module (not shown in FIG. 3).

It has now been demonstrated how business measures associated with business analysis, such as customer-relationship management services, may be defined and reused in generic manners. These measures are independent of any particular application and may be used in a plug-and-play manner with a variety of different business analyst applications.

FIGS. 4-6 present example screenshots from a measurement service (represented by the method 100 of the FIG. 1), a measurement creation service (represented by the method 200 of the FIG. 2), and/or a measure editor 302 (represented by the reusable measurement system 300 of the FIG. 3). These are presented for purposes of illustration and comprehension only and it is to be understood that other arrangements for these screenshots may be used which include other metadata from what is shown with the screenshots. Each of these will now be discussed in turn.

FIG. 4 is an example diagram of sample results associated with processing some example reusable measures, according to an example embodiment. The example results presented may be viewed as a report produced by processing a business analysis module that includes 5 different measure types. The analysis module is processed against business or enterprise data that resides in a data store.

With this background FIG. 4 is now described in greater detail. The results are presented as a table having columns and rows. The columns are associated with measure types (five different measure types are shown with a few measure types repeated multiple times within the table).

The first two columns are associated with a measure having a type of percentile profile. These columns break customers into one of ten groups depending upon the average purchase amount spent by each particular customer. Column three identifies a schema count where the total number of customers within each of the deciles is counted. Columns four and five represent segment count measures where males (column four) and females (column five) are counted for the total customer count of column three. Column six represents a tables and fields measure showing the total purchase amount within each of the deciles (notice this is roughly the same dollar amount for each of the deciles at around $170,000). Column seven is another percentile profiling measure for cumulative purchase amount; this shows a running total from column six. Finally, column eight is an attribute type measure that calculates the average number of items bought within each of the deciles.

FIG. 5 is an example diagram of a screenshot for a measure editor and some results associated with processing a reusable measure constructed from the measure editor 302, according to an example embodiment.

The screenshot of FIG. 5 shows a screen within which a particular measure has been selected. That measure has a type of tables and fields and includes a description of its processing. A variety of other metadata associated with the selected measure is shown in the screenshot as well. For example, the analysis schema is "customer" and the analysis level is "house hold." The screenshot also provided links to access other screenshots, such as for defining a "custom filter" and "calculation."

Additionally, the screenshot shows an example processing or results associated with processing the selected measure. The sample results show a dual level aggregation, which is indicative of the tables and fields measure type. The first aggregation in the sample results shows a sum of purchasing dollars per unique household times two (×2). The second aggregation averages the purchase amount to show an average amount purchased per grouping of households.

FIG. 6 is an example diagram of another screenshot for a measure editor and some example metadata for defining custom calculations for a reusable measure, according to an example embodiment. In the screenshot, a variety of available and canned calculations are identified under the "Function" listing. Specific data store tables are listed under the "Tables" listing. The fields associated with a selected table (in the screenshot this is the "TRANS" table) are depicted in the "Fields" listing. Finally, the operators for the calculations are listed under the "Operators" listing.

The custom formula may then be entered under the "Custom Formula" field at the bottom of the screenshot. A variety of buttons activate other options, such as "Apply" to use the custom formula; "Validate" to check the syntax and semantics of the custom formula; and "Close" to exit the custom formula option of the measure editor 302.

The FIGS. 4-6 illustrate some example features of the measurement service (represented by the method 100 of FIG. 1), the measurement creation service (represented by the method 200 of FIG. 2), and the measure editor 302 (represented by the reusable measurement system 300 of FIG. 3). These features are illustrated by example screen-shots.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method, comprising:
   presenting a list of measure types and schema elements against which measures associated with the measure type can be processed;
   receiving a selection for a desired measure type and one or more schema elements from the list;
   presenting a new list for available measures defined within the desired measure type;
   receiving a new selection for a desired measure from the new list; and
   presenting metadata for the desired measure to a requester, wherein the metadata defines processing associated with the desired measure which is to be processed against the one or more selected schema elements, wherein each of the available measures and the desired measure are aggregations associated with multiple calculations, and wherein at least one of the available measures uses multiple layers of aggregation as a two-step aggregation, and wherein the presented metadata includes a description of configured parameters for processing the desired measure, the description includes an analysis schema and level for a data store being used with the desired measure, calculation information for the desired measure, filter information that can be used with the desired measure, ordering information for the desired measure, and display information for the desired measure, and wherein the description describes how the desired measure goes about achieving a calculation associated with the calculation information.

2. The method of claim 1 further comprising, identifying a data store schema for the desired measure.

3. The method of claim 1 further comprising, re-iterating the method one or more additional times for different desired measures, wherein the different desired measures are restricted for use against an identified data store schema or schema element.

4. The method of claim 1, wherein presenting the list further includes presenting the measure types as at least one of an attribute measure type, a percentile profiling measure type, a segment count measure type, a schema count measure type, and a tables and fields measure type.

5. The method of claim 1, wherein presenting the metadata further includes presenting a description for using the desired measure.

6. The method of claim 1 further comprising, processing the desired measure at the request of the requester against one or more data stores.

7. The method of claim 1 further comprising:
   receiving modifications to the metadata that defines a custom aggregation to perform with the desired measure; and
   associating modifications and the custom aggregation with a business analysis module of the requestor.

8. A method, comprising:
   receiving a desired measure type;
   presenting generic metadata associated with a generic measure for the desired measure type, and wherein the presented generic metadata includes a description of configured parameters for processing the generic measure, the description includes an analysis schema and level for a data store being used with the generic measure, calculation information for the generic measure, filter information that can be used with the generic measure, ordering information for the generic measure, and display information for the generic measure, and wherein the description describes how the generic measure goes about achieving a calculation associated with the calculation information;
   receiving modifications to the generic metadata;
   identifying a data store schema and schema element for use with the generic measure; and
   storing the modified generic measure as a new measure of the desired measure type and which is associated with the data store schema and the schema element, and wherein the new measure is an aggregation associated with multiple calculations, and wherein the aggregation is a two-step aggregation that utilizes multiple layers of aggregation.

9. The method of claim 8, wherein receiving modifications further includes receiving one or more fields associated with the data store schema or the schema element and one or more calculations to perform on the fields.

10. The method of claim 9, wherein receiving the modifications further includes identifying the one or more calculations as at least one of an average calculation, a count operation, a count distinct operation, a maximum operation, a minimum operation, a sum operation, a variance operation, a cumulative operation, a grouping operation, and a custom-defined operation.

11. The method of claim 9 further comprising, receiving additional calculations associated with a second aggregation to process against results of the one or more calculations.

12. The method of claim 8, wherein presenting further includes identifying the generic measure as a previously used measure that is associated with the data store schema already.

13. The method of claim 8 further comprising, establishing a rule for the new measure, wherein the rule enforces use of the new measure with the data store schema or the schema element.

14. A system comprising:
   a data store implemented in and embodied on a machine-readable medium as a database; and a measure editor implemented in and embodied on the machine-readable medium and to be processed by a machine, wherein the measure editor is to interact with the data store and with a requester to build a business analysis module, and wherein the measure editor is to identify measures associated with selected measure types and is to assemble select ones of the measures for use in the business analysis module, and wherein the measure types, the measures, and business data, which the business analysis module processes against, reside in the data store and process against requestor identified data store schema elements, and wherein each measure is associated with an aggregation of multiple calculations that process against selective portions of the business data, and wherein at least one measure is a two-step aggregation that utilizes multiple layers of aggregation, and wherein generic metadata is presented with the measures, the presented generic metadata includes descriptions of configured parameters for processing the measures, the description includes an analysis schema and level for a data store being used with the measures, calculation information for the measures, filter information that can be used with the measures, ordering information for the measures, and display information for the measures, and wherein the description describes how the measures go about achieving calculations associated with the calculation information.

15. The system of claim 14, wherein the measure editor is to permit the requestor to at least one of create new measure types and to create new measures within the data store.

16. The system of claim 15, wherein the measure editor is to permit the requestor to modify the generic metadata associated with a particular selected measure and to record the modification as a new instance of a new measure within the data store.

17. The system of claim 14, wherein the measure editor is to permit the requestor to delete a particular selected measure from the data store.

18. The system of claim 14, wherein the measure editor is to enforce a data store schema or a schema element associated with selected measures and prevent a different schema or different schema element from being associated with the selected measures within the business analysis module.

19. The method of claim 14, wherein the business analysis module includes one or more aggregation calculations for the business data and for results associated with processing the select ones of the measures against the business data.

20. The method of claim 19, wherein a number of the one or more aggregation calculations are at least one of selected from a list and custom-defined by the requester.

* * * * *